United States Patent [19]

Kitson

[11] Patent Number: 5,132,624
[45] Date of Patent: Jul. 21, 1992

[54] METHOD AND APPARATUS FOR INSULATING ELECTRICAL DEVICES IN A LOGGING SONDE USING A FLUORINATED ORGANIC COMPOUND

[75] Inventor: David Kitson, Plano, Tex.

[73] Assignee: Schlumberger Technology Corporation, Houston, Tex.

[21] Appl. No.: 626,341

[22] Filed: Dec. 12, 1990

[51] Int. Cl.[5] ............................................. G01V 3/28
[52] U.S. Cl. .................................................. 324/339
[58] Field of Search .............................. 324/338-343

[56] References Cited

U.S. PATENT DOCUMENTS

| | | |
|---|---|---|
| 3,719,918 | 3/1973 | Kerr . |
| 4,598,967 | 7/1986 | White . |
| 4,651,101 | 3/1987 | Barber et al. . |
| 4,701,712 | 10/1987 | Seeley et al. .................. 324/340 |
| 4,767,349 | 8/1988 | Pottier et al. . |
| 4,817,437 | 4/1989 | Dennis et al. . |
| 4,872,507 | 10/1989 | Ronco, Sr. et al. . |

Primary Examiner—Walter E. Snow
Attorney, Agent, or Firm—Henry N. Garrana; John H. Bouchard

[57] ABSTRACT

A method for providing electrical insulation to electrical devices (e.g. connectors) disposed at the end of the housing of a logging sonde designed to be lowered in a borehole traversing earth formation, wherein the housing is at least partly filled in with an insulating fluid having a density greater than the borehole fluid density. Advantageously, the insulating fluid density is greater than the density of water. Preferably, the housing is filled with a mix of insulating oil and hydraulic oil having a density less than the insulating oil density. The amount of insulating fluid is such that it covers the electrical devices when the sonde is substantially in the upright position. The insulating fluid is e.g. made of a fluorinated organic compound, such as the oil sold under the name Fluorinert ® (trademark of 3M).

17 Claims, 2 Drawing Sheets

METHOD AND APPARATUS FOR INSULATING ELECTRICAL DEVICES IN A LOGGING SONDE USING A FLUORINATED ORGANIC COMPOUND

BACKGROUND OF THE INVENTION

1. Field of the Invention

The present invention relates to well logging techniques, wherein a sonde is lowered in a well or borehole to perform measurements from which are derived information about the composition and/or the physical structure of the earth formation surrounding the borehole, or the borehole fluid, or the annulus including casing and cement located between the borehole wall and the formation.

2. The Related Art

A logging sonde usually comprises a hollow cylindrical body or housing made out of metal, and in which are disposed the sensitive devices designed to perform the measurements and transmit the data via the cable to the surface. The housing is designed to contain and to protect such sensitive devices from the hostile environment of the borehole, including high temperature, high pressure and chemical/mechanical aggressions.

In order to counter balance the extremes forces which apply against the external surface of the housing, or at least to reduce the differential pressure between inside and outside of the housing, it is commonplace to fill the housing with a fluid, usually oil. Such oil is usually referred to as "hydraulic oil". Another purpose of hydraulic oil is, in electrical type sondes, to electrically insulate the electrical sensitive devices, such as coils, with respect to the housing wall and/or other conductive elements or devices disposed in the housing and which might interfere electrically with the coils. In sonic type sondes, a further purpose of hydraulic oil is to enhance propagation of acoustic waves. A still further purpose of hydraulic oil is to actuate hydraulic equipment such as pumps or pistons in logging tools designed to extract a core from the formation, as depicted in U.S. Pat. Nos. 4,714,119 and 3,596,511.

Furthermore, a sonde usually includes at each of its ends a pressure bulkhead including an electrical connector designed to electrically link the sensitive devices located inside of the housing to the electronic cartridge disposed at the top of the sonde and which is linked to the cable (at the upper end) or to another sonde (at the lower end).

These connectors must fulfill opposite requirements, since they must be fluidproof, electrically and mechanically reliable as well as easy to manipulate. These requirements are difficult to conciliate considering that the working conditions encountered in a borehole are tough.

Nevertheless, sondes often face electrical problems at the level of the electrical connector for the following reason. In spite of all precautions taken avoid leaks in the housing, some borehole fluid penetration may occur. These unwanted leaks mainly result from the repeated use of the tool in a high pressure environment which imposes high flexing stresses on seals. Practically, the hydraulic oil cannot be maintained 100% pure, meaning there might be some water and/or borehole fluid mixed in the oil. This is critical since hydraulic oil is partly miscible with water and borehole fluid is most times, if not always, conductive, and may also include some tiny metal fragments or debris resulting e.g. from wear. Water, borehole fluid and debris entering through unwanted leaks in the housing and contaminating the hydraulic oil, are heavier than the hydraulic oil. They sooner or later find their way by gravity to the bottom of the sonde, where the electrical connectors are located, and thus affect the electrical insulation at the level of the connector. This may put in jeopardy the operation of the sonde.

Accordingly, there is a need in the logging industry for improving reliability of sondes and avoid the above referred problems.

OBJECTS OF THE INVENTION

Therefore, it is an object of the invention to provide a reliable electrical insulation at the level of the connectors disposed at the ends of a logging sonde.

SUMMARY OF THE INVENTION

This and other objects of the invention are attained by a method for providing electrical insulation to electrical devices disposed at at least one end of the housing of a logging sonde designed to be lowered in a borehole traversing earth formation, wherein the housing is at least partly filled with an insulating fluid having a density greater than the density of the fluid present in the borehole.

More particularly, the insulating fluid covers the electrical devices when the sonde is substantially in th upright position.

The insulating fluid is preferably made of an organic compound sold under the name Fluorinert ® (trademark of 3M).

The invention will be readily understood upon reading of the following description with reference to the drawing in which:

DETAILED DESCRIPTION

The invention is not restricted or limited to particular oilfield services or completion operations. Thus, the principles of the invention are applicable for any well tool which has one or more components which need electrical insulation and, for that purpose, are disposed in oil-filled compartments, regardless of the type of wireline logging tool. By way of illustrative example, the invention will be hereafter described in connection with an induction logging tool, such as the one depicted in U.S. Pat. No. 4,651,101 to T. D. Barber, R. N. Chandler and J. F. Hunka, which is assigned to the assignee of this application and is hereby incorporated by reference.

Figure 1:
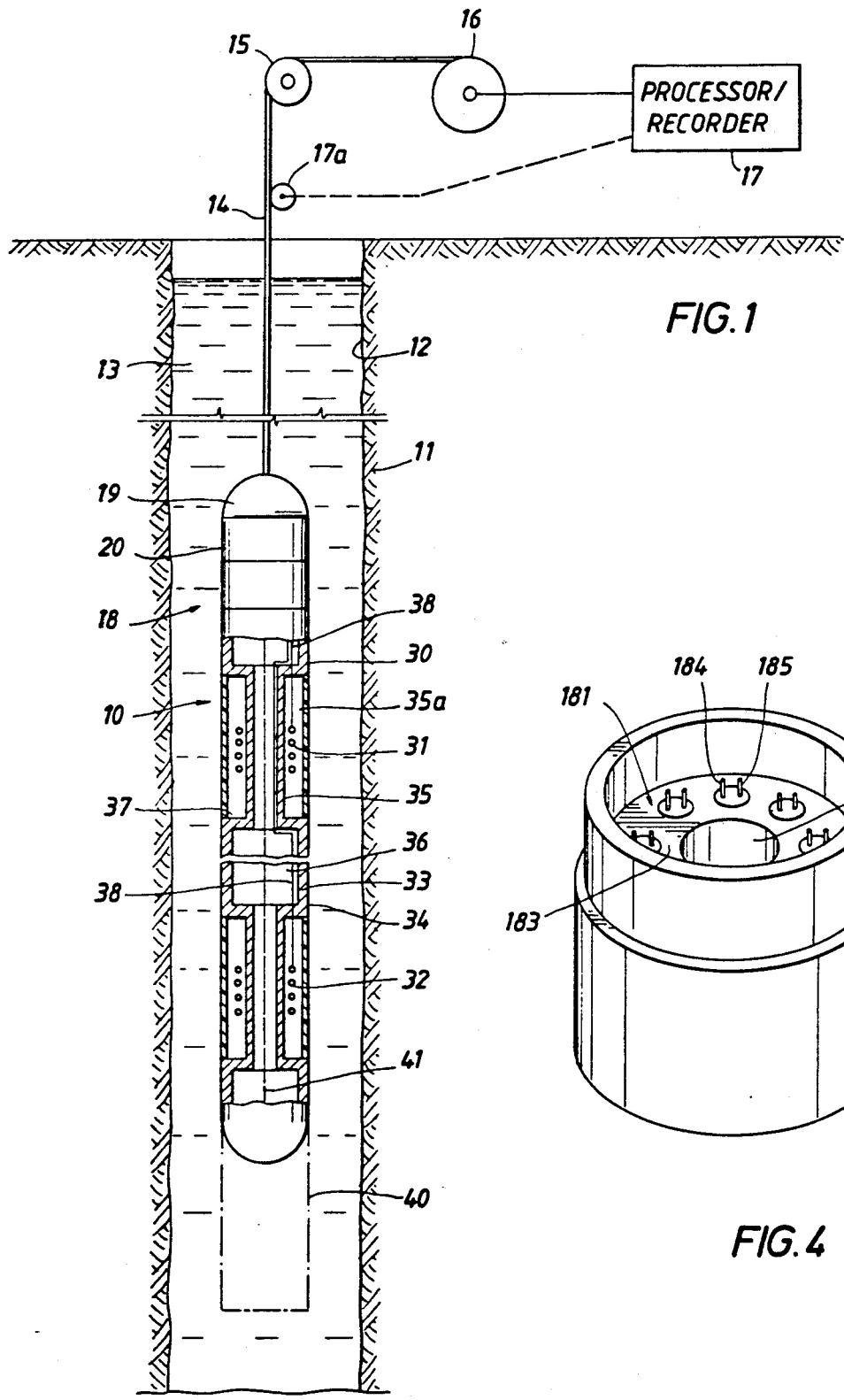
FIG. 1 shows schematically an embodiment of an induction logging sonde in accordance with the invention and the surface equipment connected to it.

FIG. 1 shows an induction logging sonde 10 for investigating the geological formations 11 traversed by a borehole 12. The borehole is filled with drilling mud 13 (hereafter referred to as "borehole fluid"). The sonde 10 is suspended from a multiconductor cable 14 which passes on a sheave 15 and is wound on a winch 16 which is part of the surface equipment associated with the downhole logging sonde. The surface equipment supplies sonde 10 via cable 14 with electrical power and signals for controlling its operation and receives from the downhole apparatus 10 measurement signals. The surface equipment includes means 17 for processing and recording these signals. A sensor 17a for detecting the motion of the cable is provided. The signals from the sensor 17a are indicative of the instantaneous depth of the sonde and are fed to the processing means for depth matching the measurement signals.

The sonde 10 comprises at the top an electronic cartridge 18 connected to the cable 14 through the cable head 19. The cartridge 18 includes a telemetry cartridge 20 which converts the signals from the surface equipment produced by the downhole apparatus to a format suitable for transmission by the cable.

The sonde 10 also comprises an elongated support or housing 30 the upper end of which is secured to the cartridge 18. The housing 30 mounts a coil system which comprises a transmitting coil 31 and a receiving coil 32 coaxial to and spaced from each other in the longitudinal direction of housing 30. The transmitting coil 31 is energized to produce a magnetic field which induces in the formation eddy currents which flow coaxially of the axis of the housing. The receiving coil 32 generates in response to the field created by these currents an output signal representative of the conductivity of the formation. The operating frequency of the transmitting coil 31 is such that the displacement currents are negligible, conduction currents being predominant, and typically lies between about 10 and about 400 kHz.

In the schematic drawing of FIG. 1, the sonde is shown to have only a transmitting coil and a receiving coil but it will be clear that each coil system can comprise more than two coils, for instance one or more transmitters, several receiver coils, and bucking coils respectively associated with the receiver coils to cancel out the effect of direct coupling between the transmitter coil and the receiver coils. The sonde could further comprise several coil systems distributed over its length.

The housing 30 has a generally tubular shape and is made of a metal, preferably a non-magnetic metal having an excellent electrical conductivity. The housing comprises cylindrical longitudinal portions 33 the outer walls 34 of which are in contact with the outside i.e. with the borehole fluid, and cylindrical longitudinal portions 35 having an outside diameter smaller than portions 33. The portions 35 thus define recesses 35a for receiving the coils 31 and 32 which are coaxial to and electrically insulated from, the respective portions 35. The embodiment shown in FIG. 1 includes such a recess for each coil, but it will be understood that one portion 35 can as well mount an entire coil system, i.e. one recess 35a can receive a plurality of axially spaced coils. The intermediate portions 33 have preferably an inside diameter larger than portions 35 and define inner spaces 36, and in the embodiment shown in FIG. 1, the portions 33 and 35 are connected by transverse portions 37. The walls of portions 33 have a sufficient thickness to withstand by themselves the hydrostatic pressure of the borehole fluid. Respective conductors 38 routed inside the support connect the coils 31 and 32 to the electronic cartridge 18.

Figure 2:
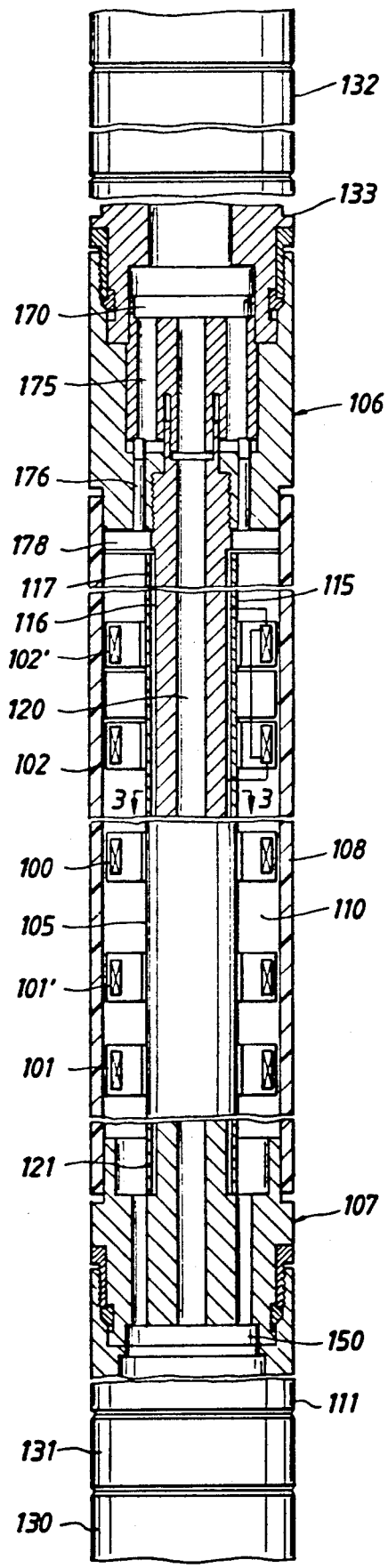
FIG. 2 is a partly sectional longitudinal view of the sonde of FIG. 1.

FIG. 2 shows in greater detail and in partly sectional view the induction sonde of FIG. 1, comprising a transmitter coil unit 100 and a plurality of arrays of solenoid coils, each coil array including a receiver coil and a bucking coil designed and positioned so as to cancel out the effect of the direct coupling of the transmitter coil to the respective receiver coil. Receiver coils with different spacings from the transmitter are shown at 101, 102, and the bucking respectively associated with the receiver coils are shown at 101', 102'. All the coils are mounted about a central support 105 having an outer cylindrical surface of circular cross-section. End portions 106, 107 of enlarged diameter are secured to the support 105 at both ends thereof. A housing 108, formed of a tubular sleeve of fiberglass epoxy, is mounted about the coils to prevent contact with the borehole fluid. The housing 108 is held in position between the end portions 106, 107, the housing having the same outer diameter as the end portions 106, 107. The free spaces in the annulus 110 defined between the central support 105 and the housing 108 are filled with pressurized oil, called "hydraulic oil", and to that effect, they are in communication with a pressure compensation device, shown at 111 adjacent the lower end portion 107. The compensation device 111, a conventional element of well logging sondes, acts to pressurize the oil present in the annulus 110 so that the differential pressure on the housing 108 is small.

Figure 3:
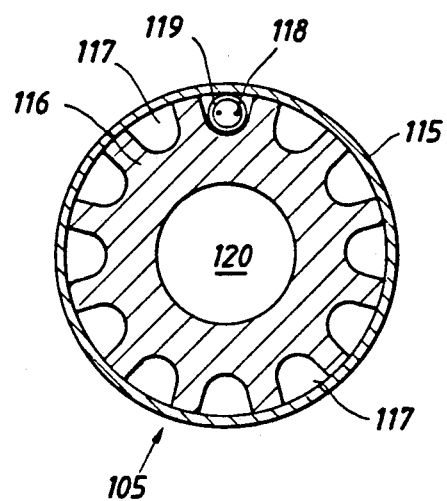
FIG. 3 is a section according to line 3—3 of FIG. 2.

The cross section view of FIG. 3 shows a preferred embodiment of the central support 105. the support 105 comprises two parts, an outer sleeve 115 preferably of a highly conductive metal such as copper or a copper alloy, and an inner core 116 preferably of a metal of higher strength such as stainless steel. The outer sleeve 115 is mounted over the inner core 116 with a loose fit to take into account the difference between copper and steel with regard to thermal expansion. The inner core 116 has a plurality of longitudinal grooves 117 formed in its outer periphery for routing conductors. As shown in FIG. 3, the grooves 117 receive conductors 118 threaded inside a tubular shield 119. Although each groove can receive a pair of conductors inside a shield, only one shield with conductors inside has been shown in FIG. 3. The purpose of shield 119 is to minimize interferences between the conductors located in adjacent grooves. The shield can suitably be made of ferromagnetic material such as mumetal. In addition to the grooves 117, the inner core has a central longitudinal bore 120 which is used to route a power line and possibly conductors connected to other logging apparatus suspended from the induction logging sonde 10. The longitudinal grooves 117 and the central bore 120 are in fluid communication with the annulus 110 through radial holes, not shown, and therefore are filled with hydraulic oil at the same pressure as in the annulus 110. A suitable method for manufacturing the inner core may be extrusion through a die of appropriate design.

The electronic cartridge necessary for the operation of the transmitter is schematically shown at 130 adjacent the lower end of the sonde, with a pressure bulkhead 131 disposed between the compensation device 111 and the cartridge 130. An electronic cartridge 132 connected to the receiver coils is mounted adjacent the upper end of the sonde, with likewise a pressure bulkhead 133 between the cartridge 132 and the coil section of the sonde. The longitudinal grooves 117 are connected at their ends to inclined passages 121 which open into the central bore 120.

Figure 4:
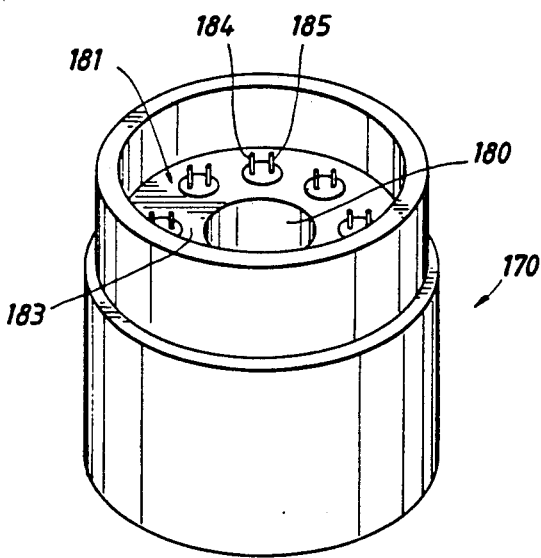
FIG. 4 is schematic perspective view of an electrical connector disposed at the end of the sonde.

The upper and lower pressure bulkheads 133, 131 are conventional pieces of equipment in well logging sondes and have axially oriented passage receiving pressure-resistant feedthroughs or connectors 150, 170, shown with more details on FIG. 4, and to which conductors are connected on both sides. Axially oriented passages 175, 176 are formed for the wires (not shown) which link the connectors 150, 170 to the coils. The passages 176 communicate with the respective grooves 117 of support 105 through a disc-shaped part 178 secured to the support and having a respective plurality of radial slots for passing wires.

Only the general structure of the sonde and the elements critical to the comprehension of the invention have been described hereabove for the sake of clarity. More details on the structure and manufacturing of sonde 10 can be found in U.S. Pat. No. 4,651,101 already referred to.

FIG. 4 shows a schematic top perspective view of the upper connector 170 which is similar to connector 150. More details about this type of connector can be found in U.S. Pat. No. 3,719,918. Connector 170 is substantially cylindrical and comprises a central bore 180 in alignment with bore 120 of central support 105. On both top and bottom sides of connector 170 is provided a cylindrical scoop delimited in the longitudinal direction by an annular transverse surface, only scoop 181 and surface 183 being visible on FIG. 4. Electrical pins, disposed e.g. by pairs 184, 185, protrude from the transverse surface 183 and are angularly regularly spaced. The electrical pins 184, 185 are linked through electrical connections (known per se and not shown) to electrical wires (such as wires 118 shown on FIG. 3) routed through spaces provided inside the housing, these wires being e.g. connected to other logging apparatus suspended from the induction logging sonde 10.

As already stated, free spaces inside housing 108 are filled with pressurized hydraulic oil, for electrical insulation and mechanical pressure balance purposes. Thus, the annulus 110 defined between central support 105 and housing 108 (see FIG. 2), as well as longitudinal grooves 117 and the central bore 120 (see FIG. 3) are filled with pressurized hydraulic oil. In particular, the electrical connections between the wires (not shown) and the electrical pins 184, 185 are immersed in the hydraulic oil. By way of example, the hydraulic oil might be oil sold under the name UNIVIS J26 by EXXON.

According to the invention, inside housing 108 is provided a certain amount of an insulating fluid, such as oil, showing good insulation properties for the embodiment described, and having a density greater than the density of the hydraulic oil and than the density of the borehole fluid. Due to gravity, the insulating oil will be located, when the sonde is in an upright position, at the bottom of housing 108, close to connector 150. The amount of insulating oil may be such that, the sonde being substantially vertical, the insulating oil covers the electrical connections located at the bottom of the housing close to connector 150. Typically, by way of example, the amount of insulating oil could be in the range of 50–300 cubic centimeters (cc), and preferably around 100 cc. In a similar way, any amount of borehole fluid or debris, that typically penetrates the sonde and thus contaminates the hydraulic oil, will find its way down inside the housing, since it is, in most of the cases, heavier than the hydraulic oil. However, the insulating oil, being heavier than these contaminating fluids or debris, will prevent the latter to reach the electrical connections, since the hydraulic oil will be placed above the layer or insulating oil and thus the contaminating fluid or debris which may be present in the hydraulic oil will not be in contact with the electrical connections. By way of example, the density of the insulating oil may be greater than 1.5. The amount of insulating oil will determine the position in the tool of the interface between the insulating oil and the hydraulic oil, said interface being associated with water or debris. Thus, this will determine the height of this contaminating products in the upright position of the tool. The amount of insulating oil could be tailored so as to bring these contaminating products at a given level in the tool where the danger of electrical damages are reduced if not absent.

The insulating oil has to fulfill the specifications required for the associated hydraulic oil. For example, in coring tools, the insulating oil has to be compatible with the hydraulic equipment such as pumps and pistons.

A further characteristic of the insulating oil is its non miscibility with water, hydraulic oil and borehole fluid.

The insulating oil is preferably made of fluorinated organic compound, derived from organic compounds where all carbon-bound hydrogen atoms are replaced by fluorine atoms. By way of example, the insulating oil may be the oil sold under the name Fluorinert ® (trademark of 3M).

As an alternative embodiment, the housing instead of being completely filled with a mixture of hydraulic oil and insulating oil, may be filled in with insulating oil only, by an amount enough to cover electrical connections in vertical position of the sonde. Since insulating oil is not miscible with water or borehole fluids, such oil is reusable, unlike the hydraulic oil. In other words, during any regular maintenance check-up, it can be submitted to simple cleaning process such as filtering and be poured back into the tool.

According to another implementation, a logging sonde of relatively small volume (a few hundreds of cc) is filled with insulating oil. Whenever water or borehole fluid penetrates the sonde, such fluid will position itself above the insulating oil, i.e. at the top. Accordingly, when carrying out a check or maintenance operation, the operator opens up the sonde (in vertical position), pours some insulating oil inside the sonde which actually expels the water. An appropriate example of such sonde is a sonde designed to carry out auxiliary measurements; such sonde is usually disposed at the top of the tool string.

What is claimed is:

1. A method for providing electrical insulation to electrical devices disposed at one end of a housing of a logging sonde adapted to be lowered in a borehole traversing an earth formation, comprising the step of:
    at least partially filling the housing with an insulating fluid having a density greater than the density of a fluid present in the borehole, said insulating fluid including a fluorinated organic compound.

2. The method according to claim 1 wherein said insulating fluid has a density greater than the density of water.

3. The method according to claim 1 wherein said housing includes a mixture of said insulating fluid and of a hydraulic oil the density of which is less than the density of said insulating fluid.

4. The method according to claim 1 wherein said insulating fluid is substantially not miscible with water.

5. The method according to claim 1 wherein said insulating fluid is substantially not miscible with said borehole fluid.

6. The method according to claim 3 wherein said insulating fluid is substantially not miscible with said hydraulic oil.

7. The method according to claim 1 wherein said insulating fluid is the product sold under the name Fluorinert ® (trademark of 3M).

8. A logging sonde adapted to be lowered in a borehole traversing an earth formation and comprising:
 a housing provided with at least one electrical connector at one of its ends, the housing being at least partly filled with a mixture of an insulating fluid and hydraulic oil the density of which is less than the density of said insulating fluid, said insulating fluid having a density greater than the density of water and the density of a fluid present in the borehole.

9. The logging sonde according to claim 8 wherein said insulating fluid is substantially not miscible with said hydraulic oil.

10. The logging sonde according to claim 8, wherein said insulating fluid covers said electrical devices when said sonde is substantially in the upright position.

11. The logging sonde according to claim 8 wherein said insulating fluid is substantially not miscible with said borehole fluid.

12. The logging sonde according to claim 8 wherein said insulating fluid is substantially not miscible with water.

13. The logging sonde according to claim 8 wherein said insulating fluid is made of a fluorinated organic compound.

14. The logging sonde according to claim 13 wherein said insulating fluid is the product sold under the name Fluorinert ® (trademark of 3M).

15. A method for providing electrical insulation to electrical devices disposed at one end of a housing of a logging sonde adapted to be lowered in a borehole traversing an earth formation, comprising the step of:
 at least partially filling the housing with a mixture of an insulating fluid and of a hydraulic oil the density of which is less than the density of said insulating fluid, said insulating fluid having a density greater than the density of a fluid present in the borehole.

16. The method of claim 15, wherein said insulating fluid is substantially not miscible with said hydraulic oil.

17. A logging sonde adapted to be lowered in a borehole traversing an earth formation and comprising:
 a housing provided with at least one electrical connector at one of its end, the housing being at least partly filled with an insulating fluid having a density greater than the density of water and the density of a fluid present in the borehole, said insulating fluid including a fluorinated organic compound.

* * * * *